(No Model.)
C. F. PIKE.
TRAP FOR WASH STANDS, &c.
No. 302,585. Patented July 29, 1884.
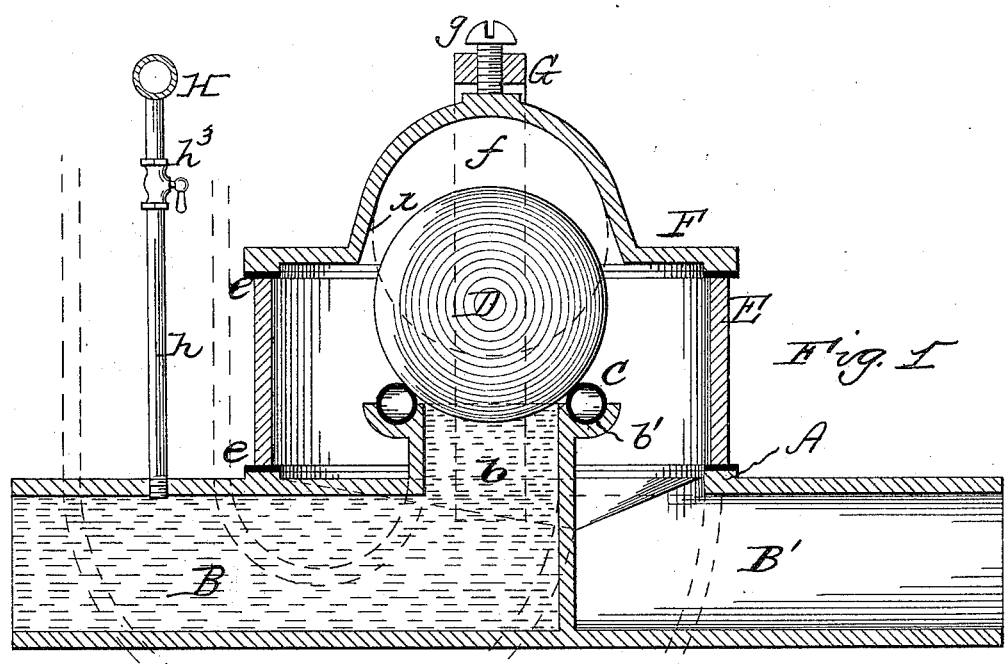
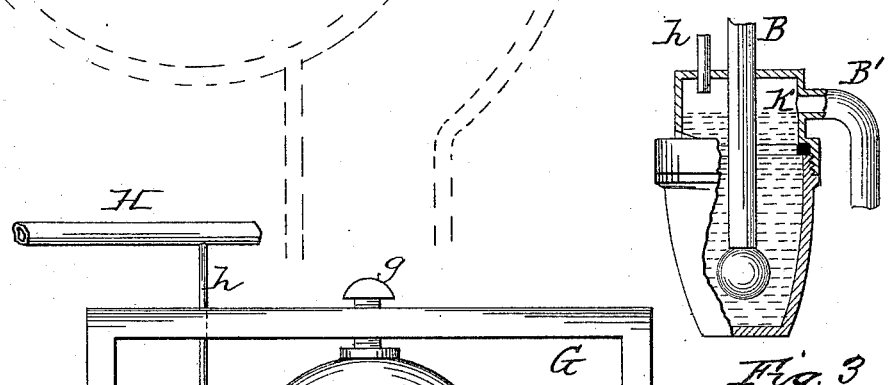
Witnesses:
Geo. Fergerson
J. Geinsinger
Inventor
Chas. F. Pike
By S. J. Van Stavoren
Attorney.

UNITED STATES PATENT OFFICE.

CHARLES F. PIKE, OF PHILADELPHIA, PENNSYLVANIA, ASSIGNOR TO THE NATIONAL ANTI-SEWER GAS COMPANY, OF SAME PLACE.

TRAP FOR WASH-STANDS, &c.

SPECIFICATION forming part of Letters Patent No. 302,585, dated July 29, 1884.

Application filed January 25, 1883. (No model.)

*To all whom it may concern:*

Be it known that I, CHARLES F. PIKE, a citizen of the United States, residing at Philadelphia, in the county of Philadelphia and State of Pennsylvania, have invented certain new and useful Improvements in Traps for Wash-Stands, &c., of which the following is a specification, reference being had therein to the accompanying drawings, wherein—

Figure 1 is a longitudinal vertical section of my improved trap. Fig. 2 is an end elevation of same, and Fig. 3 is a sectional elevation of a float ball-trap with part of my invention applied thereto.

My invention has relation to that class of traps for wash-stands and other like fixtures, wherein a valve is employed to effect a seal for preventing the escape of sewer-gas or other odors therefrom; and it has for its object to simplify the construction of the trap to cause the valve to make a more perfect seal, and to prevent the growth of animal and vegetable germs within the trap.

My invention accordingly consists of the novel combination, construction, and arrangement of the parts of the trap, as hereinafter more fully set forth and claimed.

Referring to the accompanying drawings, A, Figs. 1 and 2, represents a bottom plate having induction and eduction pipes B B', respectively, formed integral therewith. The induction-pipe is provided with a bend, $b$, having a grooved upper edge, $b'$, in which is inserted an elastic packing, C; or, if desired, said groove and packing may be dispensed with. The packing C or the upper edge of bend $b$ forms a seat for the valve D, as shown in Fig. 1.

E represents a tubular casing; F, a top therefor, provided with a socket or recess, $f$, into which the ball D passes when elevated from its seat, as represented by dotted lines $x$.

$e\ e$ indicate gaskets interposed between the casing E and top F and plate A. Said parts are connected together by a yoke, G, and set-screw $g$, or the casing and top F may be formed in one piece and secured to plate A by inclined lugs and lips, or otherwise, as desired.

The operation is obvious. Water from the waste-pipe of a fixture entering the induction-pipe B raises the valve D and escapes into the eduction-pipe B'. To prevent stagnation of water in the induction-pipe B and consequent formation of fungus growth, as fully explained in an application of even date herewith, I lead a pipe, $h$, from the induction-pipe B to a water-pipe, cistern, or other source of constant fluid-supply, H, so as to provide a constant flow of water or other fluid for the trap. As such water passes to the induction-pipe it accumulates therein until its pressure overcomes the gravity of valve D, whereupon the latter is raised and the water escapes into the eduction-pipe. By such means and operation the said parts are subjected to frequent flushings, the stagnation of water in the induction-pipe is prevented, and fungus growth avoided.

The volume of water flowing through pipe $h$ may be optionally regulated by a cock, $h^3$; or its bore may be of such size that the required amount only will pass therethrough.

In traps having a buoyancy or float ball-valve, as shown in Fig. 3, the pipe $h$ connects with the top thereof or leads into the chamber K, in which is located the ball and the tube to be sealed thereby. The water from pipe $h$ constantly flowing into chamber K, the latter is always filled with fresh running water; consequently not only is the formation of fungus growth avoided in said chamber, but the water therein is also prevented from evaporating. The ball therefor is always upon its seat, except when depressed therefrom by the fluid from the waste-pipe of the fixture.

The valve D may be of rubber, metal, glass, wood, or other suitable material. It will be noted that said valve is loose or unconnected to any part of the trap; that it is free to move without affecting or interfering with the flow from pipe $h$; that such flow is constant and its volume optionally determined, and that a double seal is provided for the trap—viz., the valve and the supply from pipe $h$—so that if the supply of water should fail the valve would serve as a seal, or if the valve should fail to work the continuous flow of water would prevent the gases from returning through the induction-tube.

I do not claim the peculiar form of plate having induction and eduction pipes, the exit for said pipes being above the plate and inclosed by a case attached to said plate in any suitable manner, as that forms the subject-matter of separate applications; nor do I limit myself to the exact construction of valve, as it is obvious that the construction shown in the applications filed on an even date with this are substantially the same.

What I claim as new is—

1. In a trap for wash-stands, basins, &c., the combination of an induction-tube having at its outlet a valve disconnected from the other parts of the trap, with a pipe, H, having pipe $h$, provided with an open outlet, and means above said outlet for optionally determining the flow passing through said pipe, substantially as described.

2. In a trap, the combination, with a bottom having induction and eduction pipes, the outlet of the induction-pipe projecting above said bottom, and provided with a valve, of a removable casing inclosing said projecting pipe, and having a recess in its top for the valve, substantially as described.

In testimony whereof I affix my signature in presence of two witnesses.

CHARLES F. PIKE.

Witnesses:
S. J. VAN STAVOREN,
CHAS. F. VAN HORN.